(12) United States Patent
Phillips et al.

(10) Patent No.: US 11,183,048 B2
(45) Date of Patent: Nov. 23, 2021

(54) APPARATUS AND METHOD FOR IDENTIFYING BALLISTIC IMPACT TO POWER TRANSMISSION ASSETS

(71) Applicant: Electric Power Research Institute, Inc., Charlotte, NC (US)

(72) Inventors: Andrew John Phillips, Harrisburg, NC (US); James Wu, Pittsburg, PA (US); Drew Benton McGuire, Trussville, AL (US); J. Mark Major, San Antonio, TX (US); Mark C. Webb, San Antonio, TX (US)

(73) Assignee: ELECTRIC POWER RESEARCH INSTITUTE, INC., Charlotte, NC (US)

( * ) Notice: Subject to any disclaimer, the term of this patent is extended or adjusted under 35 U.S.C. 154(b) by 0 days.

(21) Appl. No.: 15/724,820

(22) Filed: Oct. 4, 2017

(65) Prior Publication Data

US 2018/0102042 A1 Apr. 12, 2018

Related U.S. Application Data

(60) Provisional application No. 62/404,957, filed on Oct. 6, 2016.

(51) Int. Cl.
| | | |
|---|---|---|
| G08B 21/18 | (2006.01) | |
| G08B 27/00 | (2006.01) | |
| G01P 15/18 | (2013.01) | |
| G08B 25/00 | (2006.01) | |
| G08B 13/02 | (2006.01) | |

(52) U.S. Cl.
CPC ............ *G08B 21/182* (2013.01); *G01P 15/18* (2013.01); *G08B 13/02* (2013.01); *G08B 25/00* (2013.01); *G08B 27/001* (2013.01)

(58) Field of Classification Search
None
See application file for complete search history.

(56) References Cited

U.S. PATENT DOCUMENTS

| | | | | |
|---|---|---|---|---|
| 5,687,391 | A * | 11/1997 | Judd | G01D 21/02 340/3.44 |
| 7,107,839 | B1 * | 9/2006 | Berman | G01M 3/24 73/40.5 A |
| 7,701,357 | B2 * | 4/2010 | Deaver, Sr. | G01R 19/16547 340/646 |
| 2016/0118186 | A1 * | 4/2016 | Frimpong | H01F 27/025 307/119 |

\* cited by examiner

*Primary Examiner* — Leon Viet Q Nguyen
(74) *Attorney, Agent, or Firm* — Trego, Hines & Ladenheim, PLLC; Grandon Trego; Jonathan Hines

(57) ABSTRACT

A method of identifying a ballistic impact on a power transmission asset is disclosed. The method includes the steps of deploying a sensor assembly at the power transmission asset; using the sensor assembly to receive and process data at the power transmission asset; using an algorithm to compare the processed data to known data and determine if a ballistic impact has occurred on the power transmission asset; and triggering an alarm if a ballistic impact has occurred and dispatching personnel to the power transmission asset.

13 Claims, 4 Drawing Sheets

APPARATUS AND METHOD FOR IDENTIFYING BALLISTIC IMPACT TO POWER TRANSMISSION ASSETS

BACKGROUND OF THE INVENTION

This invention relates generally to identifying security risks to power transmission systems, and more particularly to an apparatus and method for identifying ballistic impact to power transmission assets of a power transmission system.

In 2013 and 2014, numerous physical attacks occurred to power transmission structures and associated assets. Example attacks over the past decade include (a) removing bolts from steel transmission line structures, (b) pulling over structures by attaching cables to the structure and using a vehicle to pull, and (c) attaching explosives to the structures. More recently, attacks included the use of a bulldozer. One of the more prominent attacks to power transmission assets involved the use of a firearm to shoot projectiles that impacted transformers at a substation in California. The impact by the projectiles resulted in thousands of gallons of transformer fluid being leaked into the environment, as well as, a significant power outage.

As a result of recent attacks, in 2014, the North American Electric Reliability Corporation (NERC) issued an order requiring utilities to address the physical security of critical substations. Billions of dollars are being spent to harden and monitor substations. One of the technologies being implemented is the "shot-spotter" technology which uses audio triangulation to determine if there are gunshots in an area; however, shot-spotter technology does not tell users if a transformer or other asset has been impacted by a projectile. In many cases, gunshots are relatively common around rural substations due to local hunting; thus, it is very important to know if an asset has been impacted.

In addition, it is important that the utility has increased information on what the concern is in a substation prior to sending personnel into the substation to address concerns such as low oil levels. For example, if a projectile has impacted a transformer, the utility would want to send law enforcement into the substation to investigate prior to sending personnel.

If the asset has been impacted, it would also be important to know the condition of the transformer, for example, level of oil or the presence of internal discharges, vibrations in the core, and/or impact from another source.

Accordingly, there remains a need for an apparatus and method capable of identifying impacts to power transmission assets by a projectile as well as provide health information of the asset after impact and/or during normal operating conditions.

BRIEF SUMMARY OF THE INVENTION

This need is addressed by the present invention, which provides an apparatus capable of determining when a power transmission asset has been impacted by a projectile.

According to one aspect of the invention, a method of identifying a ballistic impact on a power transmission asset includes the steps of deploying a sensor assembly at the power transmission asset; using the sensor assembly to receive and process data at the power transmission asset; using an algorithm to compare the processed data to known data and determine if a ballistic impact has occurred on the power transmission asset; and triggering an alarm if a ballistic impact has occurred and dispatching personnel to the power transmission asset.

According to another aspect of the invention, a method of identifying a ballistic impact on a power transmission asset using an apparatus having a sensor assembly configured to determine when the power transmission asset has been struck by a projectile includes the steps of deploying the apparatus at the power transmission asset and using an accelerometer of the sensor assembly to monitor acceleration of the power transmission asset; when an increase in acceleration is detected, using an electronics module of the sensor assembly to digitize a signal produced by the accelerometer and, if the digitized signal exceeds a pre-determined threshold, using the electronics module to trigger and implement an algorithm; using the algorithm to confirm a ballistic impact by comparing known data to the digitized signal; and if a ballistic impact is confirmed, triggering an alarm.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
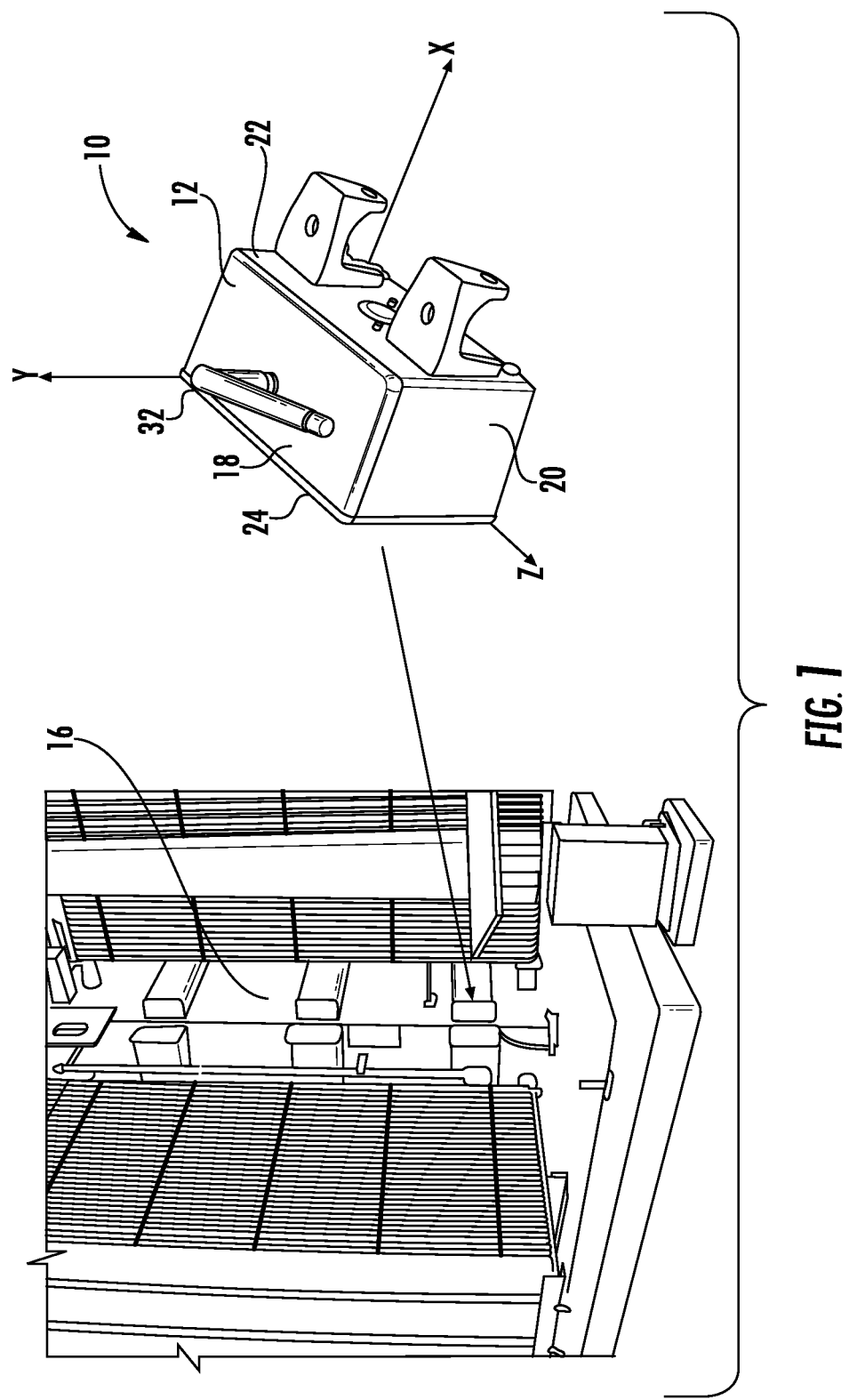
FIG. 1 shows an apparatus for identifying physical security risks attached to a power transmission asset.
Figure 2:
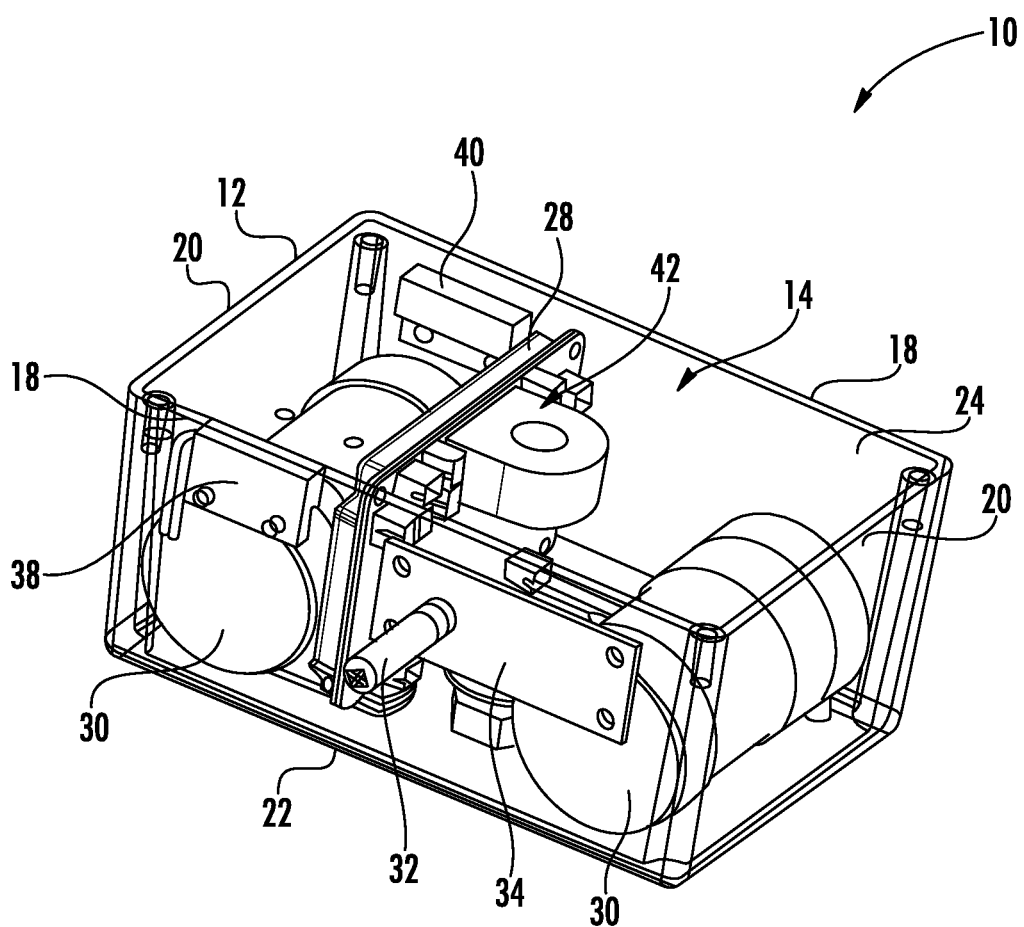
FIG. 2 shows internals of the apparatus of FIG. 1.

Referring to the drawings wherein identical reference numerals denote the same elements throughout the various views, FIGS. 1 and 2 illustrate an apparatus 10 configured to monitor and transmit data representative of a security risk to a power transmission asset. The apparatus 10 includes a housing 12 which encloses a sensor assembly 14 (described in more detail below) and protects the sensor assembly 14 from electromagnetic influences. It should be appreciated that the housing 12 may be metal, plastic, or any other suitable material. As shown, the apparatus 10 is mounted to a power transmission asset 16 to be protected and is electrically grounded or earthed, i.e. connected to a structure at electrical ground potential. The apparatus 10 may be mounted to the asset 16 using magnets, fasteners, or an adhesive.

The apparatus 10 is shown in more detail in FIG. 2. The housing 12 is generally rectangular and includes two spaced-apart sidewalls 18, two spaced-apart endwalls 20, a bottom wall 22, and a top wall 24. When used herein, the directional terms "top", "bottom", "side", etc. are merely for reference and do not imply that any specific orientation of the apparatus 10 is required. It should also be appreciated that the shape and/or design of the housing 12 may be of any suitable design and/or shape to conform to a particular application—the generally rectangular shape is used as an example only.

The sensor assembly 14 is mounted in the housing 12. The configuration of the sensor assembly 14 may be varied to suit a particular application. In the example shown in FIG. 2, the sensor assembly 14 includes an electronics module 28 which functions to receive, process, and store signals, to receive external commands, and to transmit data to an external source. Transmission of the information may be done wirelessly using radio frequency (RF) communications or using a wired connection. The RF wireless connection, as shown in the drawings, has the advantages of being more robust to electromagnetic interference and easier to install. The electronics module 28 may include, for example, a printed circuit board incorporating analog, digital and/or radio-frequency ("RF") electronic components. The electronics module 28 may incorporate discrete components and/or one or more microprocessors. The components of the electronics module 28 may be embedded in potting compound to protect them environmental influences.

In addition to the electronics module 28, the housing 12 encloses an electric power source for the electronics module 28, such as the illustrated batteries 30 (for example, high density batteries such as lithium polymers). Solar harvesting, electric field harvesting, and/or magnetic field harvesting may also be used as a power source by using separate devices, for example solar panels, connected to the apparatus 10.

The housing 12 also includes one or more RF antennas 32 which protrude from the exterior of the housing 12 and are used to transmit signals generated by the electronics module 28 to a remote receiver (not shown), and/or to receive RF signals from a remote receiver (not shown). The apparatus 10 incorporates a communication system 34 that may be based on the IEEE 805.15.4 architecture. The communication protocol allows two-way communications. It should be appreciated that the apparatus 10 may also be hardwired for two-way communications. The electronics module 28 further includes a 3D solid state accelerometer 42. The accelerometer 42 may be used to assess whether the power transmission asset is experiencing vibrations and/or whether the inclination of the power transmission asset (with respect to gravity) has changed.

Magnetically-operated switches may be mounted inside the housing 12 and coupled to the electronics module 28. The switches may be tripped by placing a magnet (not shown) in the near vicinity of the switch on the outside of the housing 12. In the illustrated example, the apparatus 10 includes a power switch 38 which toggles the apparatus 10 between an on and off state, and a reset switch 40 which signals the apparatus 10 to erase any stored data.

It should be appreciated that other suitable sensors and electronics may be included in the apparatus 10. For example, global positioning devices and temperature sensors may be employed in the apparatus 10.

Figure 3:
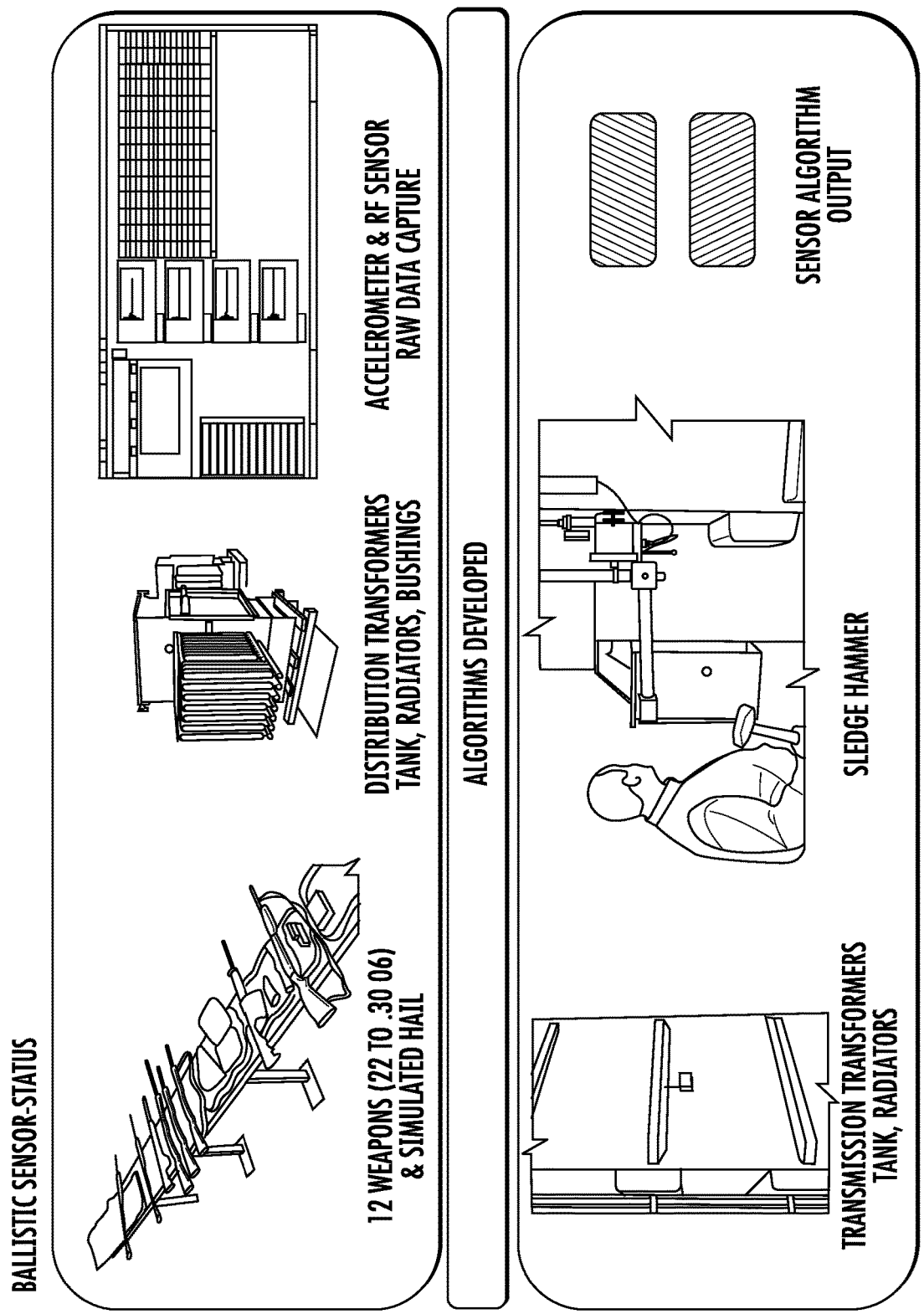
FIG. 3 illustrates various testing procedures used to form an algorithm and verify the effectiveness of the apparatus of FIG. 1 in determining that the power transmission asset had been struck.

The apparatus 10 is designed to determine when the transmission asset 16 has been struck by a projectile. To do that, testing was performed, data collected, and thresholds determined. As shown in FIG. 3, the apparatus 10 was secured to transmission assets (such as transformers, tanks, and radiators). Firearms ranging in caliber from 22 (also known as 22 caliber, such as 22 long rifle) to 30 (also known as 30 caliber, such as 30-06 Springfield, 300 Winchester, 300 Weatherby, etc.) were used to fire a projectile at the transmission assets. Data was collected for each projectile.

Figure 4:
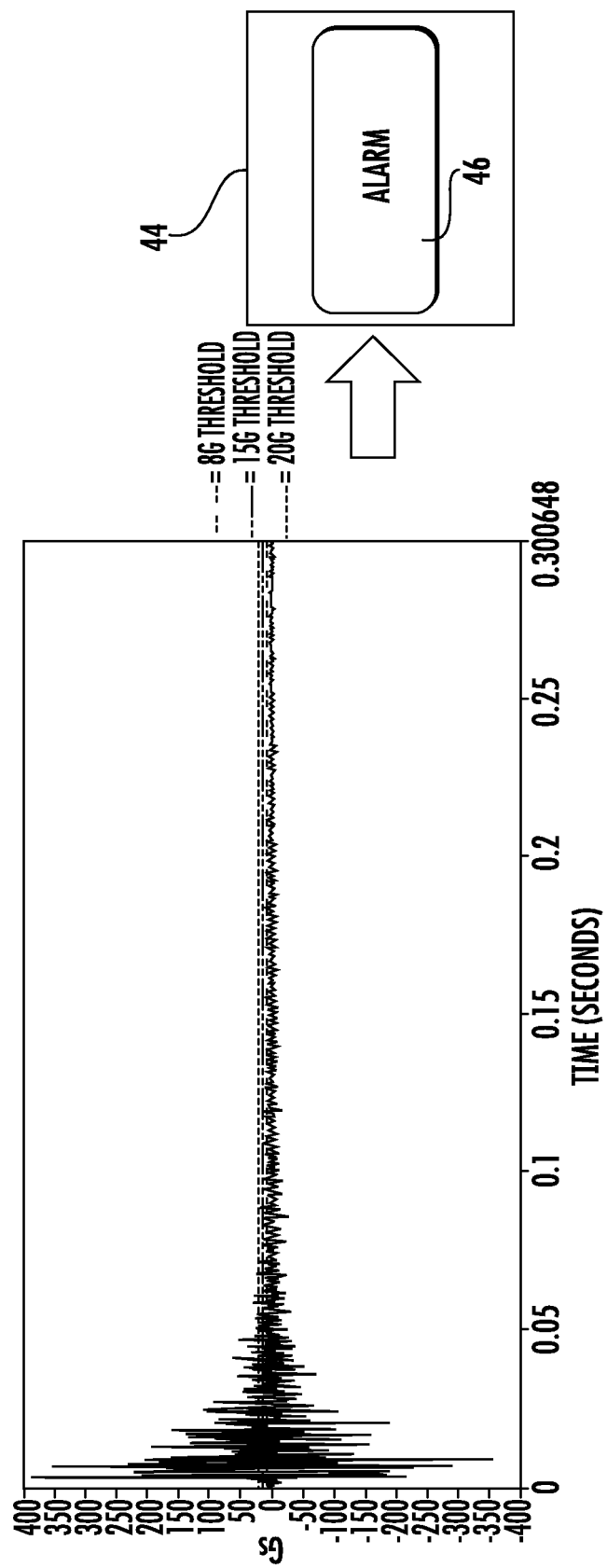
FIG. 4 is a graph showing thresholds for triggering an alarm.

In order to differentiate a projectile from environmental elements such as hail, a test using simulated hail was also conducted. Lastly, impact tests using heavy items such as a sledgehammer was conducted to differentiate a ballistic impact from an impact by a large heavy item. Once all of the data was collected, algorithms were developed and thresholds determined (FIG. 4). The algorithms take into account vibration data collected from known types of impacts (both ballistic and non-ballistic).

In use, the apparatus 10 is deployed at a power transmission asset 16 in various configurations depending on the monitoring desired. For example, if vibration and inclination are desired, the sensor unit 12 is mounted directly to the power transmission asset (FIG. 1). Once the apparatus 10 is deployed, the electronics module 28 performs on-board processing of data being received at the power transmission asset 16, thereby providing a user with processed information on which he/she can make a decision. The electronics module 28 includes both analog and digital electronics and provides analog and digital signals to ensure that data is not missed by the user.

More particularly, the accelerometer 42 is used in a mode that detects an increase in acceleration. Once an increase in acceleration is detected, the accelerometer 42 sends an interrupt signal to a microprocessor of the electronics module 28 which then starts to digitize the signal. This approach keeps power requirements low and allows the apparatus 10 to accurately detect an event and avoid missed events. If an acceleration above a specific G level is measured, the electronics module 28 triggers and implements the algorithms. The algorithms confirm a ballistic impact and filter out false positives by comparing the sensed vibration data to vibration data for known types of impacts described above. The algorithms may operate by considering data characteristics such as: (1) magnitudes, (2) shape in the time domain, (3) frequency content, and/or (4) one or all of items (1)-(3).

If an event is confirmed, the apparatus 10 transmits a signal to a data concentrator 44 that is plugged into a utility system and triggers an alarm 46. The transmission may be by wired and/or wireless transmission. For purposes of this application, the term "wired" includes copper wiring, fiber cable, and any other means that transmits data from point to point without transmitting through air. Once an alarm is triggered, personnel may be dispatched to the transmission asset 16. Additionally, the utility may dispatch law enforcement prior to sending personnel to the transmission asset 16 to determine and clear any threat level at that location.

The foregoing has described an apparatus and method for identifying ballistic impacts to power transmission structures. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A method of identifying a ballistic impact on a power transmission asset, comprising the steps of:

(a) securing a sensor assembly to the power transmission asset, the sensor assembly including:
  (i) an electronics module to receive, process, and store data;
  (ii) a communications system to provide two-way communication; and
  (iii) a 3D solid state accelerometer to measure and detect an increase in acceleration of the power transmission asset and output sensed vibration data;
(b) using the sensor assembly to receive and process the sensed vibration data at the power transmission asset to generate processed acceleration data and provide the processed acceleration data to a user, wherein the processed acceleration data provided to the user is in analog and digital form;
(c) when the processed acceleration data indicates an acceleration above a pre-determined threshold, the electronics module triggers and implements algorithms to compare the processed acceleration data to known acceleration data and determine if a ballistic impact has occurred on the power transmission asset, based solely on the comparison, wherein the known data includes vibration data of known impacts to the power transmission asset from firearms, heavy items, and environmental elements; and
(d) triggering an alarm if a ballistic impact has occurred and dispatching personnel to the power transmission asset.

2. The method according to claim 1, wherein the algorithm confirms a ballistic impact has occurred by looking at magnitudes, shape in time domain, and frequency content.

3. The method according to claim 1, wherein the sensor assembly is contained in a housing to protect the sensor assembly.

4. The method according to claim 3, wherein the housing is mounted directly to the power transmission asset.

5. A method of identifying a ballistic impact on a power transmission asset, the method using an apparatus having a sensor assembly configured to determine when the power transmission asset has been struck by a projectile, the method comprising the steps of:
(a) securing the apparatus to the power transmission asset and using a 3D solid state accelerometer of the sensor assembly to monitor acceleration of the power transmission asset and output sensed vibration data;
(b) when an increase in acceleration is detected by the accelerometer, using an electronics module of the sensor assembly to digitize the sensed vibration data produced by the accelerometer and, if the digitized sensed vibration data exceeds a pre-determined threshold, using the electronics module to trigger and implement an algorithm;
(c) using the algorithm to confirm a ballistic impact by only comparing known acceleration data of known impacts to the power transmission asset from heavy objects, environmental elements, and projectiles fired from a firearm to the digitized sensed vibration data; and
(d) if a ballistic impact is confirmed, triggering an alarm.

6. The method according to claim 5, wherein the accelerometer measures acceleration along three axes with respect to gravity.

7. The method according to claim 5, wherein apparatus transmits a signal to a utility system to trigger the alarm.

8. The method according to claim 5, wherein the known acceleration data from projectiles fired from a firearm includes impacts from projectiles ranging in caliber from 22 to 30.

9. The method according to claim 5, wherein the known acceleration data from environmental elements includes impacts by hail.

10. The method according to claim 5, wherein the known acceleration data from heavy objects includes impacts by a sledgehammer.

11. The method according to claim 5, wherein the algorithm compares magnitudes, shape in time domain, and frequency content of the known data and digitized signal.

12. The method according to claim 5, further including the step of, in response to the alarm, dispatching personnel to the transmission asset.

13. The method according to claim 1, wherein once an increase in acceleration is detected, the 3D solid state accelerometer sends an interrupt signal to the electronics module causing the electronics module to digitize the signal, thereby allowing the sensor assembly to conserve power and accurately detect an event.

* * * * *